Sept. 12, 1933.   W. DUBILIER   1,926,842
METHOD OF MAKING ELECTRICAL CONDENSERS
Filed Nov. 12, 1930
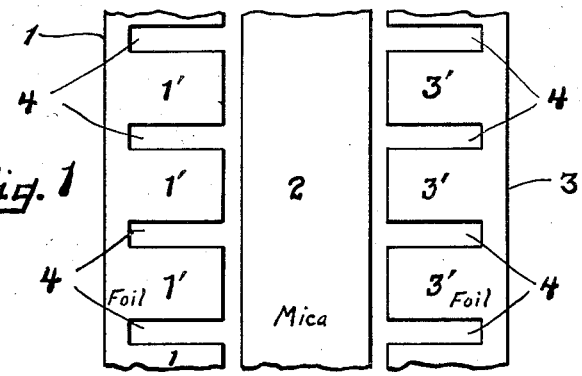
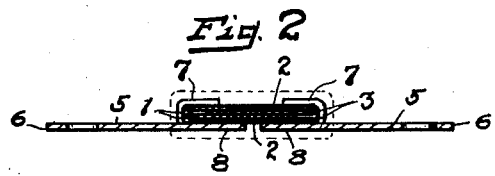
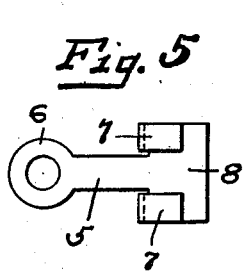
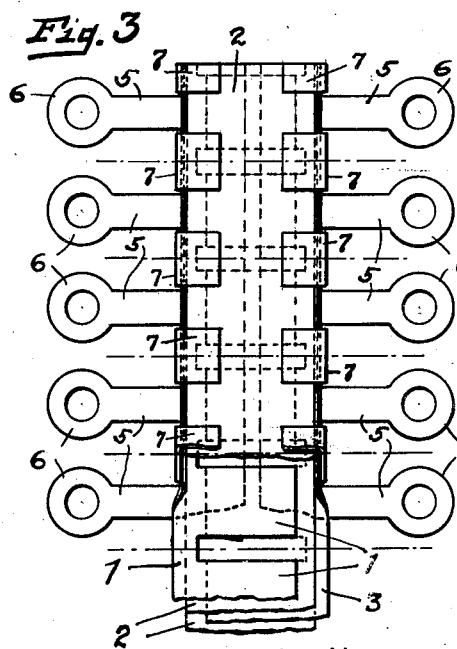
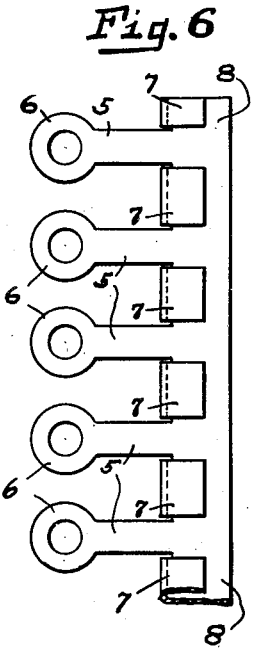
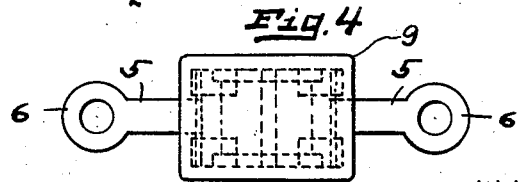
INVENTOR
William Dubilier
BY Edwards, Bower & Pool
ATTORNEYS Patented Sept. 12, 1933

1,926,842

UNITED STATES PATENT OFFICE 1,926,842

METHOD OF MAKING ELECTRICAL CONDENSERS

William Dubilier, New Rochelle, N. Y., assignor to Dubilier Condenser Corporation, New York, N. Y., a corporation of Delaware Application November 12, 1930
Serial No. 495,033

7 Claims. (Cl. 175—41)

This invention relates to electrical condensers and more particularly to a method of manufacturing condensers, which is economical and which insures increased dependability of service.

Electrical condensers, particularly those commonly used in radio receiving sets, usually comprise a number of metallic sheets or foils stacked upon each other with sheets of dielectric material interposed, and with the metallic sheets having alternate projections at opposite sides. These projections are clamped together and connected to a terminal binding post for connecting the condenser in an electrical circuit. Condensers of this kind are comparatively small in size, usually of the order of 1 to ½ square inch, and it is evident that this complicates the manufacture and assembly to a great degree and accordingly entails high manufacturing cost. Furthermore, it is necessary to treat the assembled condenser by impregnating the same in wax or other compound and this is a difficult process on account of the small dimensions of such condensers.

It is furthermore evident that the assemblage of the individual condenser units of such small dimension is very liable to impair the electric properties in that injury to the metal foil as well as of the dielectric sheets are very likely to occur which may result in an early breakdown and destruction of the condenser.

In accordance with the novel method of manufacturing electrical condensers as described by the present invention, the aforementioned drawbacks are overcome in the use of long strips sufficient for making a large number of individual condensers, which strips are assembled and treated as such and then the finished strips are cut into individual units according to the desired capacity of the individual condensers.

The invention will be described in connection with the accompanying drawing, in which Figure 1 shows the punched out metal armature strips and the insulating strips before assemblage, Figure 2 is a section of the assembled strips including terminal strips in accordance with the invention, Figure 3 is a top view of Figure 2, Figure 4 shows a single condenser unit obtained after cutting the assembled strips of Figures 2 and 3 along the dotted lines, and encasing the same in an insulating cover, Figure 5 shows an individual clip for clamping the projecting ends of the condenser armatures to serve as a connecting terminal of the condenser, and Figure 6 shows a strip of such clips as employed in Figures 2 and 3.

Referring to Figure 1, strips 1 and 3 of tin foil are punched out to leave the portions 1' and 3' with transverse slots as at 4, the width of the portions depending on the capacity values of the individual condenser units to be ultimately obtained. The strips 1 and 3 are stacked upon each other with strips of insulating material such as mica 2 placed between, such as is seen from Figure 2. The width of the insulating strip 2 is approximately equal to the length of the slots 4 so that the edges of the sheets 1 and 3 alternately project at opposite sides, the slots of successive layers registering and pointing in opposite directions.

Any desired number of such insulating strips and metal foils may be assembled together so that the individual slots of superposed layers will register. The assembly may then be treated according to any of the well known methods, such as by impregnation with wax, so that it assumes a compact and solid form. Two clips 8 having lugs 5 and terminals 6 with clamping portions 7 are arranged to clamp the assembly together and also to make contact with the projecting portions of the metal foils to serve as terminals for the condenser. Preferably, a strip of these clamps, such as shown in Figure 6, is employed, and one of these strips is applied to each side of the assembly, as shown in Figure 3, prior to cutting the individual condensers. The terminal strips may also be applied before the impregnation process, and the entire assembly impregnated in one operation. The thus assembled and treated section is then cut as indicated along the broken lines in Fig. 3 across the slots and then divided into a number of individual condenser units of the desired capacity.

Not only does my invention facilitate the manufacture of small condensers by obviating the handling and assembly of the very small elements which go to make up each individual condenser, but the use of relatively long strips gives a more accurate alignment of the foils and thus insures greater accuracy in the capacity values of the condensers. Also, a more uniform clamping pressure may be applied to the assembled strips than can be applied to each of the small condensers individually, and this materially aids in giving a uniform capacity value to the condensers. The length of the respective strips which make up the assembly will depend principally upon manufacturing convenience and the size of the individual condensers.

Figure 4 shows one of the individual condenser units which has been given a coating 9 of a suitable insulating compound, such as a phenolic condensation product, which serves as a casing for the condenser, and thus comprises what is commonly known in the art as a moulded condenser. Various other types of casings may obviously be used, or the condenser may be impregnated with a moisture proof compound and thus eliminate the necessity of a casing.

Although I have described my invention in connection with a condenser of the type shown in the accompanying drawing, I wish the same to be regarded as illustrative only since various modifications will readily suggest themselves to those skilled in the art without the exercise of inventive skill, and without departing from the spirit and scope of my invention as indicated by the appended claims.

I claim:—

1. The method of making electrical condensers which consists in stacking a number of continuous foil strips having transverse slots therein upon each other with strips of dielectric material placed between, with the slots of the superposed foils registering and with the continuous portions of alternate foils projecting in opposite directions to form terminals and cutting the assembly along lines coincident with said slots to produce a number of individual condensers.

2. The method of making electrical condensers which consists in cutting out transverse slots from one edge of a strip of conducting foil, stacking a number of such strips upon each other with strips of dielectric material placed between, with the slots of the superposed foils registering and with the continuous portions of alternate foils projecting in opposite directions to form terminals and cutting the assembly along lines coincident with said slots to produce a number of individual condensers.

3. The method of manufacturing electrical condensers which consists in stacking a number of continuous foil strips having transverse slots therein upon each other with strips of dielectric material placed between and with the slots registering and alternately pointing in opposite directions, impregnating the thus obtained assembly and cutting it along lines coincident with said slots to produce a number of individual condensers.

4. The method of manufacturing electrical condensers which consists in cutting out transverse slots from one edge of a strip of metal foil, stacking a number of such strips upon each other with strips of dielectric material placed between, with the slots of said metal strips registering and with the continuous portions of alternate foils projecting in opposite directions to form terminals impregnating the thus obtained condenser assembly to form a solid body and dividing said body into individual units by cutting it along lines coincident with said slots.

5. The method of manufacturing electrical condensers which consists in punching out from a strip of metal foil slots transverse to said strip and having a length corresponding substantially to the active part of said metal strip, placing a number of such metal strips upon each other with strips of dielectric material interposed and with said slots of successive strips registering and alternately pointing in opposite directions, impregnating the thus obtained condenser assembly and subsequently dividing it up into individual condensers by cutting it along lines coincident with said slots.

6. The method of manufacturing electrical condensers which consists in punching out transverse slots from a strip of metal foil, placing a number of such strips upon each other with strips of insulating material interposed and with the imperforate portions of the metal strips alternately projecting from opposite ends and the slots of superposed strips registering and pointing in opposite directions, impregnating the thus obtained condenser assembly and connecting the projecting ends of the metal strips by a series of terminal clamps at intervals equal to and coincident with the width of said slots, and dividing up the condenser assembly into individual condenser units by cutting it along the lines coincident with said slots.

7. The method of making electrical condensers which consists in stacking a plurality of transversely slotted foil strips upon each other with dielectric material therebetween, with the slots of superposed foils registering and with the continuous portions of alternate foils projecting in opposite directions; clamping the long edges of the resulting assembly, and cutting the clamped assembly along lines coincident with said slots to produce a number of individually clamped condensers.

WILLIAM DUBILIER.